United States Patent [19]
Richards et al.

[11] Patent Number: 5,308,637
[45] Date of Patent: May 3, 1994

[54] METHOD FOR PROCESSING FAT-CONTAINING FOOD SAUCE

[75] Inventors: Theo D. Richards, Fullerton, Calif.; Susan Keegan, Glenview; Celso O. Bejarano-Wallens, Vernon Hills, both of Ill.; Edward J. Kelley, Jr., Marietta, Ga.

[73] Assignee: Kraft General Foods, Inc., Northfield, Ill.

[21] Appl. No.: 907,828

[22] Filed: Jul. 2, 1992

[51] Int. Cl.$^5$ .............................................. A23L 1/39
[52] U.S. Cl. ................................... 426/589; 426/519; 426/520; 426/605; 426/607; 426/654; 426/661
[58] Field of Search ............... 426/589, 519, 520, 605, 426/607, 608, 654, 661

[56] References Cited

U.S. PATENT DOCUMENTS

| | | | |
|---|---|---|---|
| 2,555,467 | 6/1951 | Bogin et al. | 426/589 |
| 2,811,452 | 10/1957 | Lesparre et al. | 426/589 |
| 3,093,486 | 6/1963 | Krett et al. | 99/144 |
| 3,676,157 | 7/1972 | Wintersdorff et al. | 99/144 |
| 4,129,663 | 12/1978 | Jamison et al. | 426/602 |
| 4,461,777 | 7/1984 | Murase et al. | 426/330.6 |
| 4,539,215 | 9/1985 | Schweid et al. | 426/589 |
| 4,808,334 | 2/1989 | Ezaki et al. | 252/314 |
| 5,080,921 | 1/1992 | Reimer et al. | 426/564 |
| 5,087,471 | 2/1992 | Combes et al. | 426/589 |

*Primary Examiner*—Helen Pratt
*Attorney, Agent, or Firm*—Thomas R. Savoie

[57] ABSTRACT

Food sauces containing crystallizable fat present processing problems because the low temperatures required for reasonable commercial packaging operations frequently cause fat to solidify on equipment. The use of an emulsifier, and desirably a hydrophilic colloid suspended in liquid vegetable oil, in small amounts enables cooling of fat-containing sauces to less than 55° F. without experiencing problems of fat solidification, equipment fouling or undue viscosity increases. Preferably, lecithin is added to a fat phase of the sauce in an amount of from 0.1 to 0.3%, xanthan gum will be added at a level of 0.005 to 0.2%, and the liquid vegetable oil will be added at a level from 0.2 to 4.2%.

14 Claims, No Drawings

METHOD FOR PROCESSING FAT-CONTAINING FOOD SAUCE

TECHNICAL FIELD

The invention relates to food sauces and in particular to improving the efficiency for preparing and holding fat-containing sauces for packaging.

Prepared, packaged foods have become more popular than ever—in part due to changing demographics and life styles and in part due to the high quality and convenience of the foods currently available. Foods with sauces are particularly desirable. The sauces not only maintain the moistness of the solid meats, noodles or the like and vegetables during frozen storage, but they enhance the eating experience.

Good sauces typically contain fat because of its contribution to sauce consistency, mouthfeel and flavor. A great many flavors are fat soluble and require fat as a carrier. Typical dietary fats are liquid at body temperature, but develop significant solids contents as they are cooled to room temperature and below.

When processing foods for packaging, it is necessary to heat them sufficiently to reduce the count of viable organisms to an acceptable level. Food sauces flow well at the elevated temperatures involved but, unless the temperature for holding the sauce awaiting packaging is reduced, the foods will be overcooked. This can result in textural, flavor and nutritional degradation. Accordingly, foods are typically cooled after the desired degree of heating and held at reduced temperature until supplied to packaging equipment.

It is desirable to cool prepared foods to below 55° F. to minimize microbial growth during storage prior to packaging. Unfortunately, when the temperature is lowered to below about 60° F., typical fats tend to solidify and foul equipment. The solidified fat also undesirably increases sauce viscosity—making pumping more difficult and sometimes causing blockage of equipment lines.

It would be desirable to have an improved method for preparing food sauces which enable longer holding periods between sterilization and packaging with reduced problems associated with fat hardening at temperatures below 70° F.

DISCLOSURE OF INVENTION

It is an objective of the invention to improve the processing of sauce-containing foods.

It is an objective of the invention to improve the process for heat treating and packaging a fat-containing food sauce by increasing time periods between cleaning.

It is an objective of the invention to improve the process for packaging fat-containing food sauces by improving the ability to pump them from holding vessels to packaging containers.

These and other objects are achieved according to the invention. In one aspect, the invention provides an improved method for preparing a fat-containing sauce for packaging, said sauce comprising an aqueous liquid and a fat component which at least partially solidifies at 60° F. or higher, the process comprising: incorporating into said sauce effective amounts an emulsifier, and desirably a hydrophilic colloid in a suitable carrier such as vegetable oil; heating the sauce with agitation to a temperature and for a time period effective to obtain a sauce of uniform consistency and reduce the count of microbiological organisms to a predetermined level; and, thereafter, cooling the sauce to a temperature below 55° F.

The method enables holding the sauce for extended time periods at temperatures low enough to retard microbial growth by decreasing the usual tendency for fat to solidify on equipment surfaces. This extends the time between required cleanings. Further, the process reduces sauce viscosity at the reduced temperatures necessary for longer hold times. This makes pumping more rapid and reduces power consumption.

In a preferred form of the invention, the method comprises: incorporating into said sauce from 0.1 to 4.2% vegetable oil, from 0.1 to 0.5% lecithin and from 0.05 to 0.2% xanthan gum; heating the vegetable oil/lecithin/xanthan gum-containing sauce to a temperature of at least about 180° F; mixing the heated sauce to obtain a homogeneous mixture wherein the fat is held in a stable emulsion; and, thereafter, cooling the sauce to a temperature below 55° F.

Preferably, the lecithin is combined with a liquid fat component of the sauce prior to combining the fat with water, and the vegetable oil and xanthan gum are added to the melted fat and lecithin after water has been added.

INDUSTRIAL APPLICABILITY

The invention will be described below with specific reference to foods packaged in frozen form for home preparation. However, it is not intended to limit the invention to this form to the exclusion of other utilities.

Prepared foods, whether prepared for frozen, refrigerated or room-temperature storage all typically employ certain common processing steps. The main-meal components such as meat, vegetables, pasta, or combination of these are preferably cooked to a desired degree prior to adding a sauce component. The sauce is separately prepared to contain both aqueous and fatty ingredients. The sauce is cooked, either in stages or in a single step to achieve a desired consistency and to reduce the count of microbiological organisms to a predetermined level effective for the type of packaging to be employed. This typically involves following a set heating regimen with periodic quality control checks. The sauce is then cooled, either before or after combining with the main meal component, and held at a temperature suitable to control growth of microbiological organisms. For foods prepared for frozen storage, temperatures of less than 60° F., e.g. from the point of ice crystal formation (about 32° F.) to about 55° F. It is desirable to then hold the food at the reduced temperature for extended periods, e.g. from 4 to 16 hours, or as needed.

The invention has several advantages in this regard. Truly delicious foods can be prepared to contain the most flavorful meat and dairy (as well as vegetable) fats at the desired levels. And, importantly, the prepared sauces can be held for extended time periods without undue microbial growth. Further, these advantages can be achieved without fat coating equipment surfaces, causing fouling or unduly increasing sauce viscosity. Thus, the invention enables the preparation of high-quality, fat-containing sauces while increasing times between equipment cleaning and increasing ease of pumping for packaging.

To prepare a sauce in accordance with the method of the invention, separate fat and aqueous phases are prepared and blended. Either one or both of these phases can have added meat, vegetable or other solids which remain in discrete form. And as desired, such discrete solids can be added to the blend of the fat and aqueous phases. For the purposes of expressing the relative quantities of the various sauce ingredients below; however, these discrete solids will be omitted. Other solids such as soluble solids and highly dispersed solids such as starch and/or flour will be included. On this basis the sauces of the invention will contain at least 1% by weight of a fat which solidifies at a temperature of 60° F. or above. By the term "solidifies" it is meant that the fat will no longer flow as a liquid although it may still have a liquid component. Preferred sauces will contain from about 4 to about 30% fat of this type.

The fat phase is conveniently prepared first in a primary sauce vessel, but can be prepared in another vessel as desired. The fat phase will contain an emulsifier and at least a portion, e.g. at least 10%, of the total sauce fat. The fat phase can contain water or other aqueous materials, but these should be dispersed within a continuous fat phase. The fat can be any suitable dietary fat such as cow's milk fat (butter), other milk fat, lard, tallow, poultry fat, cocoa butter, partially or fully hydrogenated vegetable fats (e.g. palm, palm kernel, coconut, soybean, cottonseed, Canola, corn oil, and the like). When desired, fats which are less saturated as well as fat fractions and structured or synthetic fats can be employed.

The emulsifiers effective for use in the fat phase are those which are effective to emulsify the fat as a discontinuous phase upon addition to and heating with the aqueous phase. The emulsification desirable takes place with only mild agitation of the kind effective for mixing the ingredients, as opposed to the degree normally thought of for homogenization. Among the suitable emulsifiers are lecithin, egg yolk, polyoxyethylene (20) sorbitan monostearate and polyxyoethylene (20) sorbitan monooleate. Other emulsifiers as well can be employed as long as they have the above capability. The more desirable emulsifiers are further characterized by being naturally derived, for example lecithin, egg yolks, etc.

The emulsifier or combination of emulsifiers will be employed in an amount effective to achieve the desired function. Typically, the emulsifier will be employed in an amount of less than about 1% of the sauce. More typical levels will be from about 0.1% to about 0.75% of the sauce. The level should be maintained below the threshold level where its presence adversely affects the organoleptic character of the sauce. Thus, levels are desirably maintained at below 0.5%, preferably below 0.3%, based on the combined weight of sauce and any discrete solids, including combined main meal components.

The aqueous phase is prepared in a manner suitable for the particular sauce. It is typical to prepare it simply by addition of aqueous phase ingredients directly into the primary sauce vessel following preparation of the fat phase therein, but can be prepared wholly separately and then combined. It will be realized by those skilled in the art that because the method of the invention results in a sauce which has a continuous aqueous phase, the various aqueous phase ingredients can be added sequentially to achieve the most desirable processing efficiency.

The aqueous phase will typically employ a thickening agent such as a water-dispersible, modified starch such as Col Flo 67 (National Starch and Chemical) modified waxy maize starch. Starch which is derived from corn or tapioca and has been processed to strengthen the starch granules is desired. When employed, the starch is preferably separately mixed with water or other aqueous liquid and added as a slurry. Also among typical ingredients are meat stocks or broths, wine, water, milk, cream, vegetable or fruit juices or purees, sugars, salt, flavors, flavor enhancers, spices, and the like.

The method of the invention advantageously employs a hydrophilic colloid which is effective to stabilize the suspension of fat in the aqueous phase without causing undue thickening at the temperatures involved. There are some formulations where the presence of starch or other of the ingredients in the sauce takes the place of or minimizes the need for hydrophilic colloid. The hydrophilic colloids when employed in small amounts help effect the advantages of the invention of reduced viscosities at cool temperatures with reduced fat crystallization onto equipment parts, while avoiding problems of excessive viscosity due to their use at high levels. Among the effective hydrophilic colloids are natural and synthetic gums. Among the natural gums are xanthan gum, carageenan, locust bean gum, guar gum, agar-agar and mixtures of these.

The hydrophilic colloids will be employed in an amount effective for the above purpose. Typically amounts will be within the range of less than about 0.5%, e.g. from about 0 to about 0.2%, typically at least 0.05% by weight. The hydrophilic colloid can be efficiently and is preferably added to the sauce with a small amount of oil after at least a portion of the aqueous phase ingredients have been incorporated. Suitable oils are liquid vegetable oils such as corn, safflower, sunflower, soybean, and the like. The liquid vegetable oil is preferably well blended with the hydrophilic colloid prior to adding to other sauce ingredients. The oil will desirably be employed in an amount sufficient to fully blend with the hydrophilic colloid to permit its fine dispersion in the sauce. The amount of liquid oil is not enough by itself to significantly reduce the crystallization of the fat content of the sauce to achieve the advantages of the invention. Typical amounts will be from 0.1 to about 5%, e.g. from 0.2 to 4.2%.

The sauce is heated to a temperature effective (e.g., from 180° to 212° F.) to cook the sauce to the proper consistency and to achieve a requisite degree of reduction of viable microbiological organisms. The heating is preferably done with moderate agitation to stably suspend and emulsify the fat as a discontinuous phase within a continuous aqueous phase. This typically takes from about 1 to 10 minutes, e.g. about 5 minutes.

Following heating and mixing, the sauce is then cooled to a suitable holding temperature for packaging. Typically, temperatures of 55° F. or less, e.g. 50° F. in some cases, are effective. Temperatures at which ice crystals begin to form are generally avoided as are those which undesirably increase the viscosity of the sauce prior to packaging. The invention has the advantage that temperatures of less than 60° F. could not be employed in the past due to problems encountered with fat crystallization.

Prepared foods are available commercially in a number of different types and sizes of packaging. Those prepared for the consumer market are available in single servings and family-size quantities, e.g. from 1 to about 4 servings. Those prepared for food service use are typically larger, e.g. from about 5 to 50 or more, servings. A serving size will vary with the food involved, but where not specified will be assumed that a portion for an individual food portion such as meat, vegetable, pasta, or the like is from 2 to 8 ounces.

Following cooling and holding for a time period as needed, e.g. from 4 to 16 hours, the sauce is pumped or otherwise conveyed to a package wherein it is sealed and then frozen, refrigerated or retorted as required. When retorted or aseptic techniques are employed, the sauce and any food packaged therewith can be stored at room temperature. In a preferred embodiment, the sauce with combined main meal components, is fed to heat-sealable packages to form single serving portions. The packages are then sealed and frozen.

The following examples are presented for the purpose of further illustrating and explaining the invention, and are not to be taken as limiting in any regard. Unless otherwise indicated, all parts and percentages are by weight.

EXAMPLE 1

A sauce suitable for an enhancing the flavor of vegetables is prepared.

A fat phase is prepared by adding 11.5 parts chicken fat, 14 parts butter and 0.3 parts lecithin to a kettle and mixed well at a temperature in the range of from 100° to 150° F.

Next, aqueous phase ingredients, including 4.6 parts of chicken base stock with chicken and 0.1 part of a spice blend are added, and the mixture is stirred at 160° F. for five minutes. To this blend, 12.4 parts water, 7.6 parts milk, 34.5 parts chicken broth and 0.8 parts sucrose are added, and the resulting mixture is heated to 200° F. with rapid agitation.

Separately, a slurry of 2.2 parts of Col Flo 67 starch and 5.9 parts water is prepared and added to the kettle. Also added are 0.1 parts annatto extract and a slurry of 0.1 parts Keltrol F xanthan gum in 0.2 parts corn oil. The resulting admixture is heated to 200° F. and rapidly agitated for 10 minutes.

Finally, 5.6 parts of ¼ inch diced red bell peppers are added with stirring.

The resulting sauce is then cooled to 55° F. and held at that temperature for packaging. No significant fat crystallization is apparent.

EXAMPLE 2

This example describes the preparation of an alfredo sauce.

Initially, a fat phase is prepared by blending 4.5 parts butter, 0.3 parts lecithin, 3.0 parts diced onions, 0.5 parts granulated garlic, and 0.1 parts of a spice blend in a kettle. These ingredients are mixed at 185° F. for 5–10 minutes with slow-agitation until the onions are soft and the spices are dispersed.

Next, aqueous phase ingredients including 3 parts chicken base stock, 49.6 parts preheated whole milk, 27.9 parts preheated half and half, 0.5 parts sucrose, 0.3 parts sodium chloride, and 0.1 parts lemon juice, are added to the kettle and mixed for 5–10 minutes at 190° F. with medium agitation.

Then, three separate slurries are prepared: one containing 5 parts water and 1.0 part flour; one containing 10 parts water and 2.5 parts Col Flo 67 starch; and, the other containing 0.1 parts xanthan gum and 0.2 parts corn oil. These are gradually added to the kettle which, following addition is closed and heated for 5 minutes under agitation at 200° F.

Finally, 3.5 parts diced fontina cheese and 3.0 parts grated romano cheese are added, and mixed well.

The sauce is cooled to 45° F. and held there with no sign of significant fat crystallization.

EXAMPLE 3

The example describes the preparation of a meat, vegetable and gravy food.

In the first step, a fat phase is prepared by blending 1.5 parts margarine and 0.3 parts lecithin in a kettle at 100° F.

Next, 10 parts of chopped vegetables are added to the kettle, the lid is closed, and the vegetables are sauteed for 5 minutes at 185° F. under moderate agitation.

The kettle is opened, and various aqueous phase ingredients, including 14.5 parts chicken broth, 3.7 parts mushroom puree, 0.4 parts sucrose, 0.3 parts beef extract, 5.7 parts water and 1.5 parts various flavors and enhancers, are added. The kettle is reclosed and the contents are reheated to 200° F. with rapid agitation for 5–10 minutes.

Next, a slurry of 3.1 parts water, 0.6 parts all purpose wheat flour, and 0.1 part caramel color is prepared and then added to the kettle with rapid agitation at 200° F.

Then a slurry is prepared with 5.8 parts chablis and 1.0 part Col Flo 67 starch is prepared and added at 200° F. with rapid agitation.

A slurry of 0.1 parts xanthan gum and 0.2 part corn oil is added and the sauce is rapidly agitated at 200° F. with the kettle closed for five minutes.

The sauce is cooled to 130° F. and 6.4 parts pearl onion, 5.9 parts diced carrots are blended in followed by 40.9 parts of beef sirloin tips.

The mixture is then cooled to 55° F. with no evidence of fat separation.

EXAMPLE 4

A burgundy sauce, with vegetables and beef is prepared.

First, a fat phase is prepared by blending 2.3 parts margarine and 0.25 parts lecithin in a kettle at 100°–150 F. To this is added about 10.6 parts of diced vegetables and spices. The vegetables are sauteed in the kettle with the lid closed for five minutes at 185° F.

A slurry of 4 parts water and flavor enhancers is then made and added, and the mixture is heated.

To this is added further aqueous phase ingredients including 16.3 parts chicken broth, 0.5 parts sucrose, 1.9 parts beef stock and extract, 0.1 part caramel color and 5.4 parts water are added, and the resulting mixture is heated in a closed kettle with medium agitation for 5–10 minutes at 200° F. Then a slurry of 0.1 parts xanthan gum in 0.2 parts corn oil is added to the mixture which is then mixed in a closed kettle with rapid agitation for five minutes at 200° F.

The sauce is cooled to 80° F. and 0.1 parts beet juice and a cooked slurry of 1.5 parts starch and 5.8 parts wine are with medium agitation.

Then 4.4 parts julienne-cut carrots is added with slow agitation, followed by 40 parts of sirloin tip.

Upon cooling to 55° F. and holding, no significant fat separation is evident.

The above description is for the purpose of teaching the person of ordinary skill in the art how to practice the invention, and is not intended to detail all of those obvious modifications and variations of it which will become apparent to the skilled worker upon reading the description. It is intended, however, that all such obvious modifications and variations be included within the scope of the invention, which is defined by the following claims. The claims are meant to cover the claimed elements and steps in any arrangement or sequence which is effective to meet the objectives there intended, unless the context specifically indicates the contrary.

We claim:

1. An improved method for preparing a fat-containing sauce for packaging, said sauce comprising an aqueous liquid and a fat component which solidifies at 60° F. or above, the process comprising: preparing a fat phase mixture comprising at least a portion of the fat component, as melted fat, and an emulsifier; incorporating aqueous liquid into said fat phase mixture; adding to the resulting mixture of aqueous liquid and fat phase mixture, a hydrophilic colloid premixed in a liquid vegetable oil, in amounts effective to reduce the tendency toward fat solidification on equipment surfaces at 55° F.; by heating the resulting mixture of ingredients with agitation to a temperature and for a time period effective to obtain a sauce with a uniform consistency and reduce the count of microbiological organisms to a predetermined level; and, thereafter, cooling the sauce to a temperature below 55° F.

2. The method of claim 1 wherein said portion of said fat component is heated to liquify it and the emulsifier is blended uniformly therethrough.

3. The method according to claim 1 wherein the oil is employed at a level of from about 0.1 to about 5%.

4. The method of claim 1 wherein said sauce comprises from 1 to 50% of said hardenable fat and at least 1% starch.

5. The method of claim 4 wherein said sauce contains at least 2% of said fat.

6. The method according to claim 1 wherein the hydrophilic colloid is incorporated at a level of from about 0.05 to about 0.2%.

7. The method according to claim 6 wherein the hydrophilic colloid comprises a member selected from the group consisting of carageenan, locust bean gum, xanthan gum and mixtures thereof.

8. The method according to claim 1 wherein the emulsifier is incorporated in an amount of from about 0.1 up to about 0.5%.

9. The method according to claim 8 wherein the emulsifier comprises a member selected from the group consisting of lecithin, polyoxyethylene (20) sorbitan monooleate, polyoxyethylene (20) sorbitan monostearate, egg yolk and mixtures thereof.

10. A method for preparing an aqueous sauce containing fat which hardens at a temperature above 60° F., comprising: preparing a fat phase mixture comprising at least a portion of the fat, as melted fat, and an emulsifier comprising from 0.1 to 0.5% lecithin; combining said fat phase mixture with from 0.1 to 4.2% vegetable oil and from about 0.5 to 0.2% xanthan gum to form said sauce; heating the vegetable oil/xanthan gum-containing sauce to a temperature of at least about 180° F.; mixing the heated sauce to obtain a homogeneous emulsion; and thereafter cooling the sauce to a temperature below 55° F.

11. The method of claim 10 wherein the vegetable oil and xanthan gum are added to the melted fat and lecithin after water has been added.

12. The method of claim 10 wherein the sauce contains at least 2% starch.

13. The method of claim 10 wherein the sauce contains at least 20% of fat having a hardening temperature above 60° F.

14. An improved method for preparing a packaged fat-containing sauce, said sauce comprising an aqueous liquid and a fat component which at least partially solidifies at 60° F., the process comprising: preparing a fat phase mixture comprising at least a portion of the fat component of the sauce and an emulsifier, the emulsifier comprising a member selected from the group consisting of lecithin, polyoxyethylene (20) sorbitan monooleate, polyoxyethylene (20) sorbitan monostearate, egg yolk and mixtures thereof and is incorporated in an amount of from about 0.1 to about 0.5%; mixing into the fat phase, ingredients effective to form an aqueous phase; preparing a dispersion of a hydrophilic colloid in a vegetable oil carrier, wherein the hydrophilic colloid comprises a member selected from the group consisting of carageenan, locust bean gum, xanthan gum and mixtures thereof and is incorporated at a level of from about 0.05 to about 0.02% as a dispersion in from 0.1 to 4.2% vegetable oil; adding the dispersion of hydrophilic colloid and vegetable oil to the mixture of fat phase and aqueous phase ingredients; heating the resulting sauce with agitation to a temperature effective to obtain a uniform consistency and reduce the count of microbiological organisms to a predetermined level; thereafter cooling the sauce to a temperature below 55° F.; holding said sauce at a temperature below about 55° F. for at least four hours; and, then, conveying said sauce into a package.

* * * * *